MULTISTABLE ELECTRICAL SWITCHING MEANS EMBODYING SEMICONDUCTORS

Filed Jan. 31. 1961 4 Sheets-Sheet 1

INVENTOR
GEORGE ABRAHAM
Glenn S. Ovrevik Agent
BY Richard C. Reed
ATTORNEY

May 18, 1965 G. ABRAHAM 3,184,602

MULTISTABLE ELECTRICAL SWITCHING MEANS EMBODYING SEMICONDUCTORS

Filed Jan. 31. 1961 4 Sheets-Sheet 2

INVENTOR

GEORGE ABRAHAM

BY Glenn S. Dvorevik Agent
Richard Oakes(?)

ATTORNEY

INVENTOR
GEORGE ABRAHAM
BY Glenn S. Ovrevik Agent
Richard C. Reed
ATTORNEY

INVENTOR
GEORGE ABRAHAM

BY

ATTORNEY

United States Patent Office 3,184,602
Patented May 18, 1965

3,184,602

MULTISTABLE ELECTRICAL SWITCHING MEANS EMBODYING SEMICONDUCTORS

George Abraham, 3107 Westover Drive SE., Washington, D.C.

Filed Jan. 31, 1961, Ser. No. 86,262
14 Claims. (Cl. 307—88.5)
(Granted under Title 35, U.S. Code (1952), sec. 266)

The invention described herein may be manufactured and used by or for the Government of the United States of America for governmental purposes without the payment of any royalties thereon or therefor.

The present invention relates in general to electrical signal translating circuits and in particular to multistable circuits. Multistable circuits are used as fundamental elements in many electronic devices. By way of example, in an electronic counter, a plurality of multistable circuits, connected in tandem, may be used when it is desired to count pulses occurring either at regular intervals or at random. At present, counters of this variety employing conventional bistable circuits have a number of disadvantages. For example, to obtain only 2 stable states conventional circuits usually require a complicated arrangement using two transistors or two electron tubes. Thus, when several bistable circuits are utilized in a single counter, the physical size and weight of the counter is appreciable. If electron tubes are used, the power consumption is high and a large portion of the power supply to the counter, because of low efficiency, is dissipated as heat.

In other applications for patent, such as my application, Serial No. 629,762, filed December 20, 1956, now U.S. Patent No. 2,939,965 which issued June 7, 1960, I have disclosed notable advancements of the art whereby a composite voltage-current characteristic with a plurality of negative resistance regions could be obtained. These advancements involved the electrical connection of separate elements in a series arrangement. The need for a more compact circuitry which would accomplish the same end result has now developed.

In accordance with the foregoing it is an object of the present invention to provide a compact multistable circuit having more than two stable states.

Another object of the present invention is to provide a multistable circuit employing a minimum number of circuit elements and requiring a negligible amount of power.

Another object of the present invention is to provide an electrical circuit having a voltage-controlled negative resistance characteristic with a plurality of stable states.

It is still another object of this invention to provide a multistable electrical circuit of the voltage-controlled negative resistance variety which may be triggered from one stable or oscillatory state to another utilizing a single load line.

It is a further object of this invention to provide a multistable circuit of the voltage-controlled negative resistance variety which permits fabrication on a single slab of semiconductor substrate.

Other objects and many of the intended advantages of this invention will be readily apparent as the same becomes better understood with reference to the following detailed description when considered in connection with the accompanying drawings wherein:

FIG. 1 discloses a typical embodiment of the present invention.

FIG. 2*a* represents the equivalent circuit of a transistor before dynamic B+ is applied.

FIG. 2*b* represents the equivalent circuit during the application of dynamic B+.

FIG. 2*c* represents the equivalent circuit immediately after the dynamic B+ has been removed from the transistor.

Figure 9:
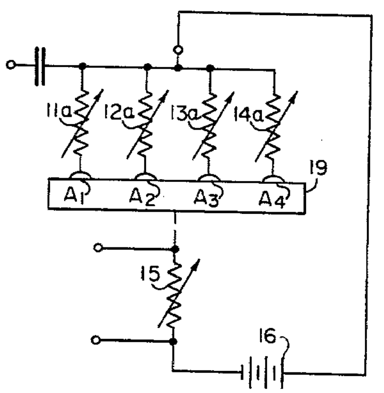

FIG. 9 discloses another typical embodiment of this invention on a single substrate.

Figure 10:
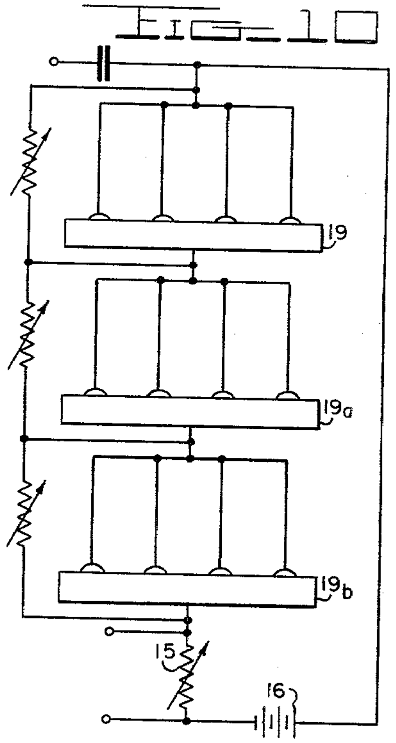

FIG. 10 also disclose another typical embodiment of this invention with serially-connected composite devices of FIG. 9.

Figure 11:
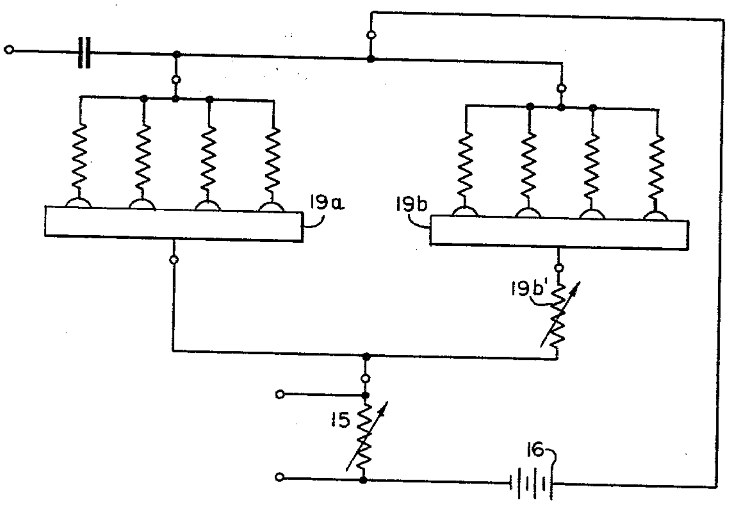

FIG. 11 discloses still another typical embodiment of this invention with parallel connection of composite devices shown in FIG. 9.

As used in the present application dynamic B+ is defined as a periodically varying potential applied to a selected non-linear device to store energy therein and to enable the device to function as an amplifier and/or to exhibit a negative resistance characteristic. As an example, a source of dynamic B+ may be a source of recurring signals having a frequency or a repetition rate greater than the reciprocal of the effective lifetime of the minority electrical charge carriers which had been injected into the variable impedance device.

In accordance with the present invention, a multistable circuit is provided wherein a plurality of devices each capable of exhibiting a short-circuit stable type of negative resistance characteristic are connected in parallel across an output circuit such that negative resistance portions of the characteristic curve overlap at selected current levels and means are provided for increasing or decreasing the negative resistance or active region of each device. In the illustrated embodiment, a high frequency energy source, known in the art as a source of dynamic B+ is connected in series with a battery and the output load impedance across a plurality of devices which are each connected in parallel with one another. The source of dynamic B+ is adapted to inject electrical charge carriers into the plurality of variable impedance devices at a rate greater than the electrical charge carriers decay due to recombination to maintain a steady state of stored electrical charge carriers in the variable impedance devices. The stored electrical charge carriers are used to obtain a composite negative resistance curve having a plurality of regions in which stable states of operation may be located. The number of these stable regions will be at least one more than the number of variable impedance devices connected in parallel. The multistable circuit thus obtained may be triggered to a desired stable region several ways, such as by varying the relative amplitude, phase or width of pulses applied to a selected element of the variable impedance devices or by varying the impedance load on the variable impedance devices or by varying the frequency, amplitude, or phase of the dynamic B+ applied to the variable impedance devices, etc. For example, triggering from a first stable region to a second stable region may be accomplished by applying a pulse of proper polarity and proper amplitude, for a given load line, to a desired element of a selected variable impedance device and a pulse of reverse polarity and proper amplitude will trigger the multistable circuit from the second to the first region.

In one illustrated embodiment, utilizing minority carrier storage devices, a source of dynamic B+ is incorporated such that the short-circuit stable negative resistance characteristic typical of such operation of this type of device may be utilized. In the other illustrated embodiments, of FIGS. 9, 10 and 11 tunnel diode devices are utilized and the source of dynamic B+ is not essential to the operation of the device, in obtaining a voltage controlled negative resistance.

Figures 1, 2A, 2B, 2C:
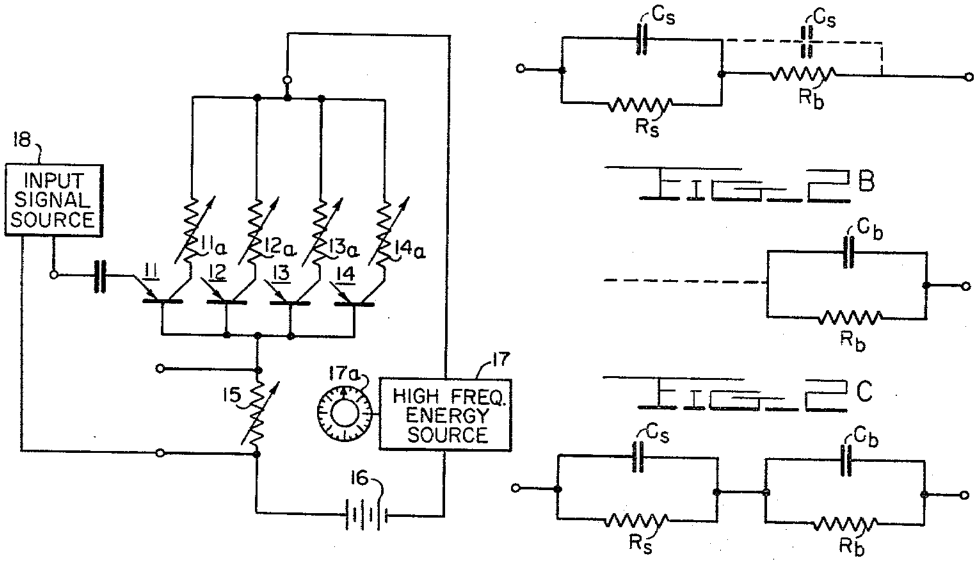

Referring to FIG. 1, a typical embodiment in obtaining a voltage-controlled negative resistance of a multistable circuit of this invention is shown comprising a plurality of variable impedance devices 11, 12, 13 and 14 connected in series with variable resistances 11*a*, 12*a*, 13*a*, 14*a*, respectively, and in shunt with one another across variable impedance 15, battery 16, and high frequency energy source 17 in series connection. Control knob 17*a*, which is shown connected to the high frequency energy source 17, may be employed to manually vary such parameters of the source as frequency, phase, duration and magnitude. The output of the multistable circuit may be taken across variable impedance 15, as indicated. A source of input signals 18 is connected to a selected element of variable impedance device 11. It is, of course, understood that the source of input signals 18 could be connected with proper polarity to another element of variable impedance device 11 or to a desired element of variable impedance devices 12, 13, or 14.

The variable impedance devices 11, 12, 13, and 14 may be any devices capable of exhibiting a short-circuit stable negative resistance characteristic. For example, properly operated semi-conductor devices such as tunnel diodes, transistor triodes, transistor tetrodes, and photo transistors may be utilized. In the case of electrical charge storage devices, the electrical charge carriers may be any positive or negative charges such as electrons, ions, or holes. The dynamic B+ in the particular embodiments shown may be any source of recurring signals so long as the frequency, or repetition rate of the recurring signals, is greater than the reciprocal of the lifetime of injected electrical charge carriers and so long as one element of each variable impedance device is driven positive with respect to another element of the variable impedance device during each cycle of operation.

The variable resistances 11*a*, 12*a*, 13*a*, and 14*a* are provided to insure that the effective parallel impedances of devices 11, 12, 13, and 14 and then serially-connected variable resistances, respectively 11*a*, 12*a*, 13*a*, and 14*a*, are different. It will be appreciated, of course, that where the junction impedances of the devices 11, 12, 13, and 14 are designed to be appropriately different, the variable resistances 11*a*, 12*a*, 13*a* and 14*a* are not essential to the invention and may be eliminated from the circuitry. As a practical matter, it has been found advisable to incorporate these variable resistances to permit control of the impedance ratio of these devices.

In the embodiment shown in FIG. 1, a regulated voltage square-wave generator is used as the high frequency energy source 17, the variable impedance devices 11, 12, 13, and 14 may be point contact or junction transistors of n type base material and therefore, the injected electrical charge carriers are holes. It will be appreciated that other types of dynamic B+ could be used in combination with selected variable impedance devices to maintain a steady state of electrical charge carriers. For example, a high frequency, sine-wave oscillator could be used to inject and store electrons in a tetrode transistor having a p type base material. In the operation of the multistable circuit shown in FIG. 1 the high frequency energy source 17 is applied to variable impedance devices 11, 12, 13 and 14, and after a few cycles of operation, the number of holes stored in various impedance devices reaches a steady state. Signals are then applied to the circuit via the selected element of variable impedance device 11 from the source of input signals 18 to trigger the multistable circuit to any one of a plurality of stable states.

In order to understand the operation of the multistable circuit shown in FIG. 1, it is necessary to appreciate the relationship between several factors which affect the number of holes stored in the steady state. When the variable impedance devices 11, 12, 13, and 14 are junction transistors, some of the factors to be considered are the transistor impedance, the load impedance, the bias, and the parameters of the high frequency energy source such as frequency, magnitude, phase and duration.

Referring again to the embodiment of FIG. 1, the number of holes that will be stored in n type base material of a transistor will be determined in part by the internal impedance of the transistor, i.e., by the appropriate barrier and base capacitances, the barrier and base resistances of the device.

The transistor impedance is dependent in part on such factors as the lifetime of the electrical charge carriers and the diffusion length in the base material of the transistor. These factors in turn are determined by the material used and the process of fabricating the transistor. The internal impedance is also dependent in part on the conditions under which the transistor is operated in a particular circuit. This will become apparent upon analysis of FIGS. 2*a*, 2*b*, and 2*c* which, it will be recalled, represent the equivalent circuit of a transistor before, during and immediately after the application of dynamic B+.

Referring in FIG. 2*a*, when no dynamic B+ is applied to a transistor, if the transistor is a point contact unit having n type, 5 ohm-centimeter germanium base material, the value of the barrier capacitance $C_s$ will be approximately 3 mmf.; the value of the barrier resistance $R_s$ will be approximately 5000 ohms; the base capacitance $C_b$ will be less than 0.2 $\mu\mu$fd., which normally may be neglected; and the base resistance $R_b$ will be approximately 100 ohms. The value of each impedance will be determined, in part, by the material used and the process of manufacture of the point contact transistor.

In the preferred operation of the embodiment of FIG. 1, a large magnitude of square wave dynamic B+ is applied to the transistors. As the dynamic B+ increases to its positive maximum value, there is considerable diffusion of electrical charge carriers into the base, and the value of the base capacitance $C_b$ becomes relatively large, approximately 350 $\mu\mu$fds. The base resistance $R_b$ becomes smaller, approximately 60 ohms. As shown in FIG. 2*b*, these values cannot be neglected. The barrier capacitance $C_s$, because of the increased storage of electrical charge carriers, becomes larger, approximately 200 mmf. but the barrier resistance $R_s$ approaches 0, shunting out the increased barrier capacitance $C_s$. The barrier capacitance $C_s$ and the barrier resistance $R_s$ may, therefore, be neglected as shown in FIGURE 2*b*.

As shown in FIG. 2*c*, when the dynamic B+ goes to 0, the barrier capacitance $C_s$ instantaneously returns from the larger value 200 mmf. to the smaller value of 3 mmf. and the barrier resistance $R_s$ instantaneously returns from approximately 0 to 100 ohms. The base resistance $R_b$, however, returns slowly from the smaller value of 60 ohms to the larger value of 100 ohms, and the base capacitance $C_b$ returns slowly from the larger value of 350 mmf. to the smaller value of 0.2 mmf. Before the base capacitance $C_b$ can attain its smaller value another pulse of dynamic B+ is applied to the transistor to return the base capacitance $C_b$ to its larger value. If a series of pulses are applied by the dynamic B+ to the transistor at a frequency greater than the reciprocal of the lifetime of the injected electrical charge carriers, after a few cycles of operation, the base capacitance $C_b$ will attain an average value. The number of electrical charge carriers stored in base capacitance $C_b$ will, likewise, attain an average value or steady state that will be dependent in part upon the magnitude, duration, and frequency of the dynamic B+ applied to the transistor. Whereas the foregoing is particularly directed to point contact devices, other devices for example of the junction type may also be used in this embodiment with appropriate changes in bias and impedance values.

Figures 4, 7, 8:
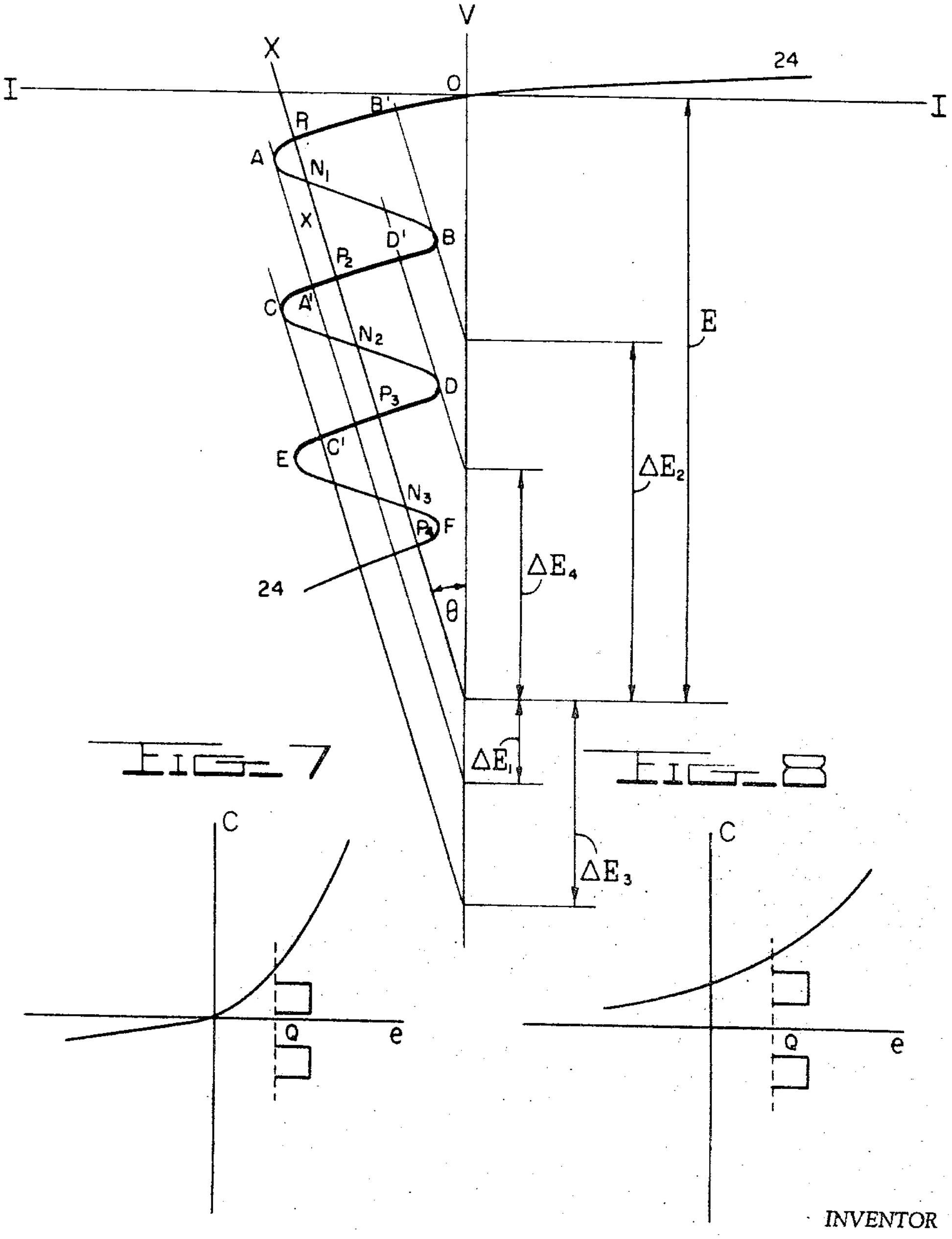
FIG. 4 represents a single load line drawn on one composite negative resistance curve with the various impedance devices in the circuit shown in FIG. 1.
FIG. 7 shows the variable resistance characteristic versus applied dynamic B+ curve of a transistor.
FIG. 8 shows the variable compacitance characteristic versus applied dynamic B+ curve of a transistor.

Referring to FIGS. 7 and 8, it is noted that the barrier capacitance and barrier resistance characteristic of a transistor (collector-base junction) are nonlinear and that the quiescent value of the barrier capacitance and resistance are dependent upon the bias applied to the transistor. As shown in FIGS. 7 and 8, when dynamic B+ is applied to the transistor, the barrier capacitance and barrier resistances vary in dependency upon the magnitude of the dynamic B+. These variations determine in part the magnitude of the steady state as explained in connection with FIGS. 2*a*, 2*b*, and 2*c*.

The number of electrical charge carriers stored in the steady state is dependent in part upon the value of the load impedance and consequently may be varied by changing the value of load impedance. Hence, in FIG. 1, the magnitude of the steady state may be controlled, for example, by variable resistor 15.

Figure 3:
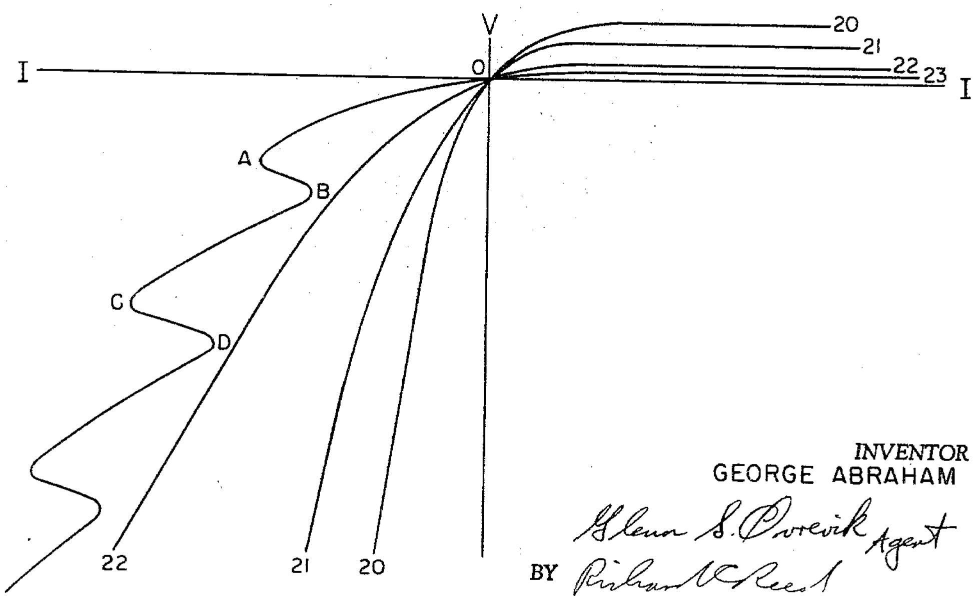
FIG. 3 represents the negative resistance curves of the variable impedance devices in the circuit shown in FIG. 1.

The number of electrical charge carriers stored in the steady state will affect the shape of the composite voltage-current characteristic curve of variable impedance devices 11, 12, 13 and 14 when the magnitude of the dynamic B+ applied to the transistors is zero. In FIG. 3, curve 21 represents the composite voltage-current characteristic when a relatively small magnitude of dynamic B+ is applied and curves 22 and 23 represent the voltage-current characteristic when the relative magnitude of dynamic B+ is increased, the magntiude of dynamic B+ applied to obtain curve 23 being greater than the magnitude applied to obtain curve 22. It is noted that as the magnitude of dynamic B+ is increased, the conductivity of variable impedance devices 11, 12, and 13 increases, i.e., the current flow through the variable impedance devices per unit of voltage applied increases. This, in effect, is feedback which results in regeneration and is attributed to the storage of electrical charge carriers. Thus, in the circuit shown in FIG. 1, as the magnitude of the dynamic B+ is increased, the number of stored electrical charge carriers is increased and curve 20 assumes the position of curve 22.

Similar results could be obtained by maintaining the magnitude of the dynamic B+ constant and changing another factor that controls the number of minority electrical charge carriers stored, such as, the duration or frequency of the dynamic B+.

In order to understand the shape of curve 23, it is necessary to bear in mind that in general the junction impedances of the variable impedance devices 11, 12, 13 and 14 differ with respect to one another. That is the resistance portion of the junction impedance, which is the principal portion at low frequencies, differs in each device. It is noted that since variable impedance devices 11, 12, 13 and 14 are connected in a parallel circuit, and their junction impedances differ, curve 23 is a composite voltage-current characteristic of the several variable impedance devices. The portion of curve 23 from O to B may be attributed primarily to the build-up of electrical charge carriers in variable impedance device 11 and the portion of curve from B to D may be attributed primarily to the build-up of electrical charge carriers in variable impedance device 12, etc. As the magnitude of the dynamic B+ applied to the circuit shown in FIG. 1 is increased and the voltage across the variable impedance devices increases, regeneration in device 11 causes a part of curve 22 to assume the position of portion OA of curve 23. As the voltage across the variable impedance devices increases further, regeneration is increased until with sufficient regeneration negative resistance appears in the vicinity of point A between A and B on the curve 23. Thereafter, increased voltage across the variable impedance devices forms the negative resistance portion AB of curve 23. Essentially the same curve forming process will reoccur as the voltage across the variable impedance devices increases to cause a part of curve 22 to assume the position of the portion CD of curve 23. Thus, it is seen that variable impedance devices 11, 12, 13 and likewise, 14 display in general negative resistances at different voltage ranges in the composite characteristic.

Figure 6:
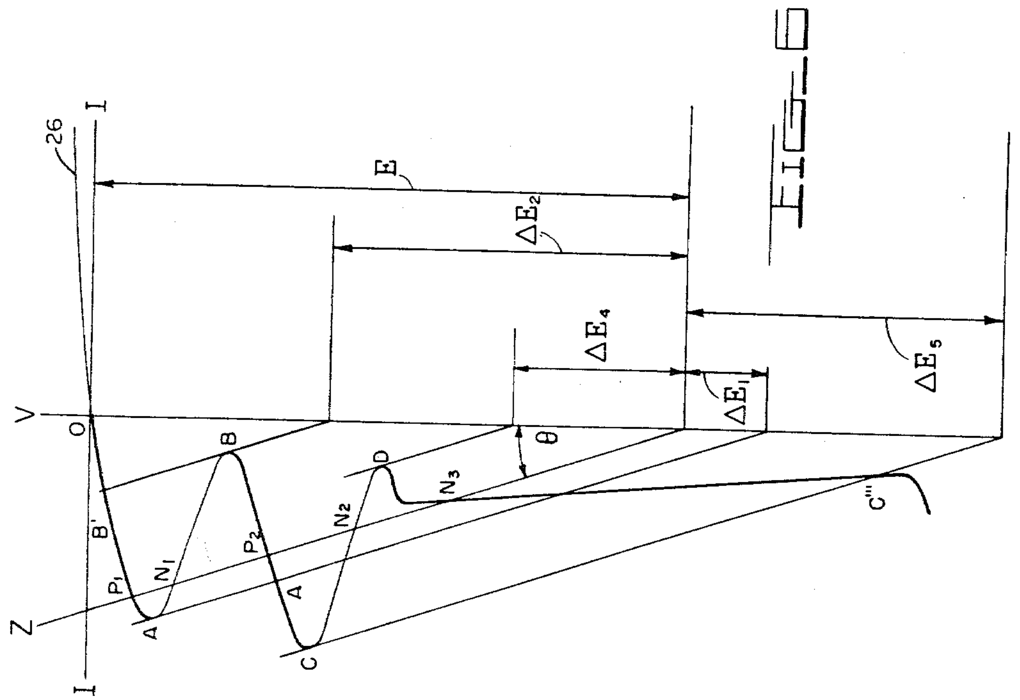
FIG. 6 represents a single load line drawn on still another composite negative resistance curve of the variable impedance devices in the circuit shown in FIG. 1.
Figure 5:
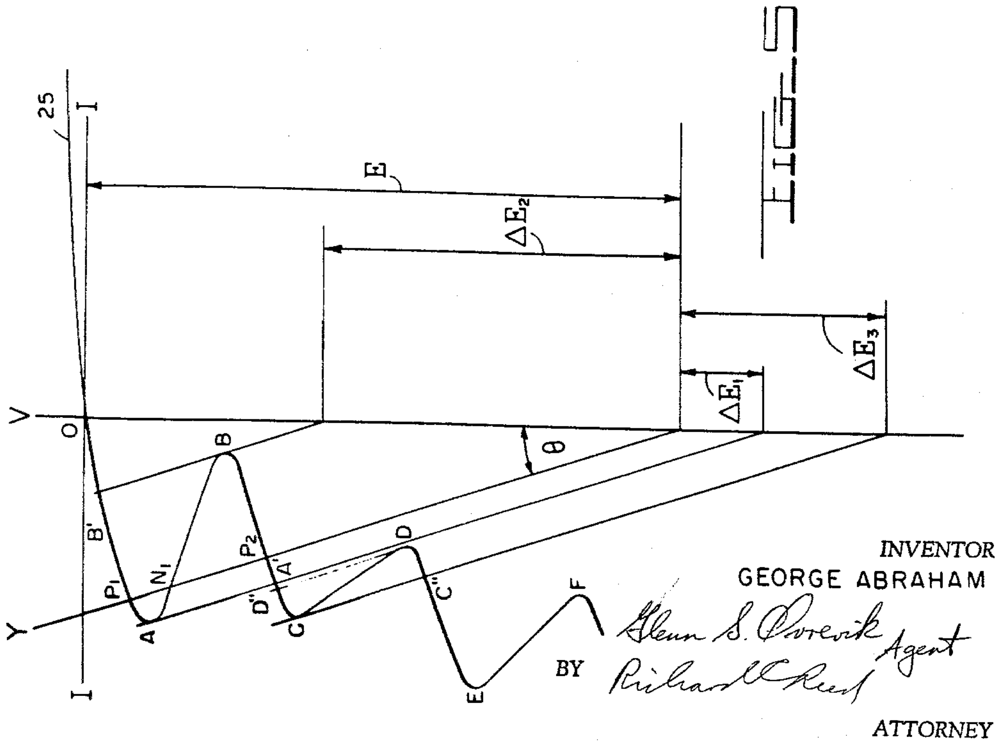
FIG. 5 represents a single load line drawn on another composite negative resistance curve of the variable impedance devices in the circuit shown in FIG. 1.

The curve 23 in FIG. 3 the curve 24 in FIG. 4, the curve 25 in FIG. 5 and the curve 26 in FIG. 6 each depicts a composite voltage-current curve having a characteristic which is generally termed in the art as an "S" type, "voltage-controlled" or "short-circuit stable" negative resistance characteristic. For purposes of the present disclosure, the term short-circuit stable is employed to define this type of negative resistance characteristic.

Referring to FIG. 4, a composite short-circuit stable voltage current characteristic curve 24 is shown which is similar to curve 23 in FIG. 3 but differs in the relative position of the several portions thereof with respect to one another. In particular, the negative resistance regions A–B, C–D and E–F overlap at a selected current level. It has been found that by control of the relative internal impedances of the several devices 11, 12, 13 and 14 by various techniques to be described hereinafter, the position of the portions of the composite voltage-current characteristic curve representative of the respective devices 11, 12, 13 and 14 may be shifted such that negative resistance and positive resistance regions of each portion will overlay similar regions of the other portions and therefore may be intersected by a common positive resistance load.

It will be appreciated that in the present state of the art, a determination of the precise internal impedance of each of the devices 11, 12, 13 and 14 prior to the assembly therefor would be costly and perhaps impractical on a mass production basis. However, appropriate values of internal impedances may be obtained by a variety of less costly standard laboratory techniques such as oscilloscope comparison of various devices under identical excitation conditions before the parallel assembly thereof or simple substitution of various devices in the parallel connection of FIG. 1 to obtain the proper combination which affords a characteristic curve of the type shown in FIG. 4.

As a practical expedient, external means may be provided to control the effective internal impedances of the devices 11, 12, 13 and 14. For example, resistive elements such as depicted in FIG. 1 (11*a*, 12*a*, 13*a* and 14*a*) may be employed in series with each of the transistors 11, 12, 13 and 14. Otherwise, in the case of transistors or other minority charge carrier devices of this variety, the source of dynamic B+ 17 may be replaced by individual sources of dynamic B+ applied across the devices 11, 12, 13 and 14 and varied independently to alter the relative internal impedance thereof. In the case of transistors, individual variable D.C. sources, not shown, also may be utilized, by connection across the emitter-base, to vary the relative internal impedance (collector-base) of the devices 11, 12, 13 and 14.

FIG. 9 depicts another embodiment of the invention comparable in many respects to the embodiment of FIG. 1, wherein the variable impedance devices 11, 12, 13 and 14 are associated on a common slab of semi-conducting material indicated at 19, in a single complex variable impedance device. In this embodiment, alloyed junctions are indicated at $A_1$, $A_2$, $A_3$ and $A_4$. It will be appreciated that with a uniform semi-conducting material as the base slab 19, and with identical manufacturing techniques and conditions, the alloyed junctions would be substantially identical. As pointed out previously, it is essential to the operation of this invention that the relative impedances of the devices 11, 12, 13, and 14 be different. Therefore, in the instance when alloyed junctions are identical, some means for altering the impedances of the parallel branches such that they will differ is essential to this embodiment. In FIG. 9, the series resistances 11*a*, 12*a*, 13*a* and 14*a* serve this function. It will be appreciated, of course, that these series resistance need not be variable, as shown, and that fixed resistances may be substituted if desired. In FIG. 9, as in the embodiment of FIG. 1, variable load impedance 15 and D.C. source 16 are connected across the parallel connection of variable impedance devices and the output is taken across the load impedance 15. In distinction, however, the variable impedance devices 11, 12, 13, and 14 in FIG. 9 are shown as two terminal devices of a variety such as a tunnel diode which does not require a source of dynamic B+ for utilization of its negative resistance characteristic. In a typical case, the variable impedance devices 11, 12, 13 and 14 in FIG. 9 might be semiconductor devices having what is known as a "forbidden region" or "band gap" where there are no states available for its electrons. In this type of semiconductor device, the states below the band gap, in the region termed the "valence band," are almost entirely filled, while the states above the band gap, in the "conduction band" are almost all empty. The number of empty states in the valence band, or electrons in the conduction band, can be controlled by adding either acceptor impurities or donor impurities to the semiconductor crystal. Each acceptor impurity takes one electron out of the valence band and each donor gives one electron to the conduction band. In this way p-type (empty states in valence band) and n-type (electrons in conduction band) region can be built into a crystal. The surface where two of these regions touch each other is called a p-n junction and the device shown in FIG. 9 is generally termed a tunnel diode. In a tunnel diode the bands which overlap each other at zero bias become uncrossed as the bias is increased. As the bands become uncrossed, the negative resistance characteristic appears, that is, as the bias is increased, the current decreases.

FIG. 10 depicts still another embodiment of the invention employing tunnel diode type variable impedance devices. In this embodiment a plurality of complex variable impedance devices on respective base slabs indicated at 19, **19*a*, and 19*b*, are shown in series connection with the load impedance 15 and D.C. source 16** connected thereacross.

It has been found that in the case of devices of the tunnel diode variety, the spacing between adjacent tunnel diodes should be greater than the effective barrier width (e.g. greater, than, for example, 150 angstroms), thereby allowing for use of advanced microcircuitry techniques. It will be appreciated that this embodiment affords a number of advantages over the embodiments of FIGS. 1 and 9. For example the embodiment of FIG. 10 provides a voltage distribution which is useful in applications where the voltage across one variable impedance device would exceed breakdown voltage rating of the device. In addition, the embodiment is useful where physical limitations restrict the number of contacts per slab.

FIG. 11 also depicts an embodiment of the invention employing a plurality of complex variable impedance devices of the variety shown in FIGURES 9 and 10. In the embodiment respective base slabs indicated at **19*a* and 19*b* are shown in parallel connection with the load impedance 15 and D.C. source 16 connected thereacross. In this embodiment the branches of the abovementioned parallel connection including the slab indicated at 19*b* includes a variable series impedance 19*b* which establishes each of the two complex variable impedance devices at a different level. It will be appreciated that in a selected application the series impedance 19*b* need not be variable and that this series impedance is only necessary where the junctions on slabs 19*a* and 19*b*** have substantially identical characteristics.

Furthermore, it will be noted that in the embodiments of FIGURES 10 and 11 the impedances **11*a*, 12*a*, 13*a* and 14*a*** are not incorporated with each complex variable impedance device. This is accomplished by grading the base material, for example, from $2\times10^{19}$ to $5\times10^{19}$ impurities/cc. germanium. In this arrangement the breakdown current points on the characteristic curve are "built in" to sum asymmetrically. Using this technique the variable resistors of FIG. 9 can be omitted, given properly designed asymmetrical junction characteristics.

It will be seen that the means for varying the internal impedance of the devices 11, 12, 13 and 14 is not critical to the invention and that a variety of different means may be employed for this purpose.

It will be noted that a single load line is drawn on each of the composite voltage current characteristic curves 24, 25 and 26 of the multistable circuit shown in FIGS. 4, 5 and 6, respectively. Each of these load lines is drawn through a point on the voltage ordinate that is determined by the bias applied to variable impedance device 11 by the source of D.C. voltage 16 at an angle whose cotangent is equal to the sum of resistance 15 and the impedance of variable impedance devices 12, 13 and 14, i.e., the sum of the impedance load on variable impedance device 11, assuming other impedances in the circuit, such as the impedance of the dynamic B+, are negligible. It will be noted that each of the load lines *x*, *y* and *z* in FIGS. 4, 5 and 6, respectively, is shown intersecting the composite voltage-current characteristic curves 24, 25 and 26 at several points, in regions where the slope of the curve is negative as well as where the slope of the curve is positive. The points of intersection in the positive slope region represent stable points operation for the multistable circuit, $P_1$, $P_2$, $P_3$, etc. On the other hand, the points of intersection in the negative resistance region $N_1$, $N_2$, etc. (FIGS. 4 and 5), do not represent points of operation for values of load resistance greater than that of the negative resistance. As will be discussed hereinafter in connection with FIG. 6 the points of intersection in the negative resistance region $N_1$, $N_2$, etc., may be points of operation for values of load resistance less than the negative resistance.

In FIG. 4, the curve 24 is so adjusted relative to the load line to permit bistable, tristable, etc., operation depending upon the number of negative resistance regions available, between selected levels dependent upon the value and polarity of the input pulse signal applied to the circuit via the variable impedance device 11 by the source of input singals 18 in the embodiment of FIG. 1. For purposes of this disclosure, the "value" of the input pulse signal is to be considered as a function of pulse magnitude and pulse width and the input signal is to be considered as the effective voltage applied across the series combination rather than the actual voltage applied to the emitter by source 18.

Considering bistable operation of the device of this invention, under the conditions of characteristics curve 24, a normal bias voltage E maintains the device in a stable condition, for example, in its first stable region O–A, at point $P_1$. Thereafter, an input pulse from input source 18 of $\Delta E$, value and negative polarity with respect to bias voltage E will move the circuit to switching condition point A whereupon switching to the next stable region B–C, to point A′, will suddenly occur.

After this pulse is applied the device will remain in the second stable region B–C, at point $P_2$, (*a*) until an input pulse of value $\Delta E_2$ and of positive polarity is applied which will move the circuit to switching condition at point B whereupon switching to the first stable Region O–A, to point B′ will suddenly occur, or (*b*) until an input pulse of value $\Delta E_3$ and of negative polarity is applied which will move the circuit to switching condition at point C whereupon switching to the third stable region D–E, to point C′, will suddenly occur. Again the voltage E will maintain the circuit in its stable state at point P, of the region O–A or, at point $P_3$ of the region D–E until another input pulse of selected value and polarity is applied.

In FIG. 5 the curve 25 is so adjusted relative to the load line Y to permit bistable operation in the first and second stable regions and to permit monostable operation in another region dependent upon the value and polarity of the voltage applied to the circuit via the variable impedance device 11 by the source of input signals 18 in the embodiment of FIG. 1.

Bistable operation in the first and second stable regions of characteristic curve 25 is identical with that just described in connection with characteristic curve 24. Since the load line Y does not intersect either the second negative resistance region or the third stable region, a different type of operation generally termed monostable occurs in the second and third stable regions B–C and D–E, respectively. Thus when the device is being maintained in its second stable region B–C, at point $P_2$, by reason of the normal bias voltage E, and an input signal of value $\Delta E_3$ and of negative polarity is applied to the circuit, the device is moved to switching condition at point C whereupon switching to the third stable region D–E, to point C'', will suddenly occur. As long as the input signal remains, the device will stay in the third stable region at point C'' but as soon as the input signal is removed, the device moves to switching condition at point D whereupon switching to the second stable region B–C, to point D'', will suddenly occur. Again the voltage E will return and maintain the device in its second stable region B–C, at point $P_2$, until another input signal of selected value and polarity is applied to the circuit.

In FIG. 6, the curve 26 is so adjusted relative to the load line Z to permit bistable operation in the first and second stable regions and to permit astable operation in another region.

Again, the bistable operation in the first and second stable regions of characteristic curve 26 is identical with that described in characteristic curve 24. In this instance the load line Z intersects the second negative resistance region at $N_2$, does not interest the third stable region DE and intersects the third negative resistance region at $N_3$. Thus when the device is being maintained in its second stable region B–C, at point $P_2$, by reason of the normal bias voltage E and an input of value $E_5$ and negative polarity is applied to the circuit, the device is moved to switching condition at point C whereupon switching to the third negative resistance region, to point C''', will suddenly occur. At point C''', assuming sufficient reactance in the circuit, oscillation begins. It will be appreciated that there must be an appropriate amount of reactance in the circuit for oscillation to occur. As long as the input signal remains, oscillation continues at point C''' and when the input signal is removed the normal bias voltage controls and oscillation continues at point $N_3$. Thereafter an input pulse from input source 16 of value E will move the circuit into the stable region D–E and into switching condition at point D whereupon switching to the next stable region B–C, to point D, will suddenly occur. Again the voltage E will maintain the circuit in stable region B–C, at point $P_2$, until another input pulse of selected value and polarity is applied.

While bistable operation involving switching between adjacent stable regions has ben described in connection with FIGS. 4, 5 and 6, it will be appreciated that switching between other stable regions may be obtained, employing comparable circuitry, by the application of input pulse signals of greater value. In such instance, of course, a correspondingly greater output signal may be obtained.

For example, in FIG. 4, switching may be accomplished from point $P_1$ of the first stable region to point $P_3$ of the third stable region by the application of a pulse of negative polarity having a value $\Delta E_3$ and returned to point $P_1$ of the first stable region, if desired, by the application of a pulse of positive polarity having a value $\Delta E_2$. It will be appreciated that the pulse values listed above are the minimum values required for the switching actions and that the value of the pulse is not critical so long as it attains the required minimum and does not go above the minimum requirement for the next adjacent stable region.

It will be seen that by proper orientation of the characteristic curve relative to the load line, the input voltage $\Delta E_1$ and $\Delta E_2$, for example, may be of equal value such that a switching action for bistable operation may be obtained by a reversal of the polarity of the input signal. Likewise, by proper orientation, the negative input voltages $\Delta E_1$, $E_3$, etc., for example, may be in any selected relation such as $\Delta E_3 - n\Delta E_1$ or $\Delta E_3 = \Delta E_1 + nk$ where $n$ is an integer and $k$ is a constant voltage.

The device this invention has been tested and operated successfully and has provided a quadristable and higher radix counter. This has been accomplished with a single slab of extrinsically doped n-type germanium. 99% indium. .5% gallium dots (.010 diameter) p-type dots were employed and ohmic contacts (Phosphor bronze cat's-whiskers) were affixed to the dots in this reduction to practice.

Furthermore, the device of this invention may be triggered from one state to another by other means than the input pulse variation discussed above. For example, the device of this invention may be triggered by varying the slope of the load line or by varying the frequency, phase or duration of dynamic B+ applied to the individual variable impedance devices. Basically, any means for increasing or decreasing the energy level of the system, electrical, optical, thermal or otherwise, may be employed to trigger the device of this invention. By this invention, a new multistate circuit has been provided which in its multistable operation may be triggered from a first selected stable region to a second selected stable region by the application of a first input signal and from a second stable region to a third stable region by the application of a second input signal, ad infinitum. Thus the device will produce an output representative of the input signal applied and may be employed as a pulse counter. In addition to its multistable operation, the device may be adapted for monostable or astable operation or combinations thereof in conjunction therewith, if desired. As a result, a vastly more useful computer type operation may be obtained with a minimum number of circuit components.

Another feature of the device of this invention is in its variable input sensitivity. Dependent upon the location of the load line, the device may be employed in applications where, for example, either 1 millivolt or 1 volt input signal is available.

It should be understood, of course, that the foregoing disclosure relates to only a preferred embodiment of the present invention and that it is intended to cover all changes and modifications of the example of the invention herein chosen for the purposes of disclosure, which do not constitute departures from the spirit and scope of the invention.

What is claimed is:

1. An electrical circuit having a composite voltage-current characteristic with a plurality of negative resistance regions comprising at least one plurality of individually operative semiconductor devices each having a significant internal impedance and each capable of exhibiting a negative resistance characteristic, a pair of terminals, means connecting each of said individually operative semiconductor devices in parallel across said pair of terminals, output load impedance means and means for energizing said devices serially connected across said pair of terminals to form a current conductive loop with said plurality of individually operative devices connected across said pair of terminals, such that each of said individually operative devices has a negative resistance characteristic of the short-circuit stable variety, each of said individually operative devices having a different negative resistance, the negative resistances of said devices being in such relation that a composite voltage-current characteristic is provided thereby, and control means connected to said electrical circuit for biasing said devices for operation at selected points on said composite voltage-current characteristic.

2. The circuit as defined in claim 1 wherein said individually operative semiconductor devices exhibit a short-circuit stable negative resistance characteristic due to the storage of minority charge carriers.

3. The circuit as defined in claim 1 wherein said individually operative semiconductor devices exhibit a short-circuit stable negative resistance characteristic due to a quantum mechanical tunneling effect of the tunnel diode variety.

4. The circuit as defined in claim 1 wherein said individually operative semiconductor devices are transistors operated in the avalanche mode which exhibit a short-circuit stable negative resistance characteristic.

5. The circuit as defined in claim 1 wherein said means connecting each of said individually operative semiconductor devices in parallel across said pair of terminals includes a respective resistive element in series with each of said individually operative devices.

6. The circuit as defined in claim 3 wherein said means connecting each of said individually operative semiconductor devices in parallel across said pair of terminals includes a respective resistive element in series with each of said individually operative devices.

7. The circuit as defined in claim 3 wherein each of said devices in parallel connection are on a common substrate and form an integrated circuit.

8. The circuit as defined in claim 7 wherein said common substrate is a graded semiconductor material and the grading is such that each of said individual devices has a different negative resistance characteristic.

9. The circuit as defined in claim 1 wherein at least two pluralities of individually operative semiconductor devices are included, said pluralities of devices are connected in series across said pair of terminals, and all of said devices differ in negative resistance characteristic and are in such relation with respect to each other that a composite voltage-current characteristic is provided thereby.

10. The circuit as defined in claim 3 wherein at least two pluralities of devices are included, said pluralities of devices are connected in series across said pair of terminals, and all of said devices differ in resistive impedance and are in such relation with respect to each other that a composite voltage-current characteristic is provided thereby.

11. The circuit as defined in claim 8 wherein at least two pluralities of devices are included, said pluralities of devices are connected in series across said pair of terminals, and all of said devices differ in resistive impedance and are in such relation with respect to each other that a composite voltage-current characteristic is provided thereby.

12. The circuit as defined in claim 1 wherein at least two pluralities of devices are included, said pluralities of devices are connected in parallel across said pair of terminals, and all of said devices differ in resistive impedance and are in such relation with respect to each other that a composite voltage-current characteristic is provided thereby.

13. The circuit as defined in claim 3 wherein at least two pluralities of devices are included, said pluralities of devices are connected in parallel across said pair of terminals, and all of said devices differ in resistive impedance and are in such relation with respect to each other that a composite voltage-current characteristic is provided thereby.

14. The circuit as defined in claim 8 wherein at least two pluralities of devices are included, said pluralities of devices are connected in parallel across said pair of terminals, and all of said devices differ in resistive impedance and are in such relation with respect to each other that a composite voltage-current characteristic is provided thereby.

References Cited by the Examiner

UNITED STATES PATENTS

| | | | |
|---|---|---|---|
| 2,614,140 | 10/52 | Kreer | 307—88.5 |
| 2,770,740 | 11/56 | Reeves et al. | 307—88.5 |
| 2,889,469 | 6/59 | Green | 307—88.5 |
| 2,922,898 | 1/60 | Henisch | 307—88.5 |
| 2,939,965 | 6/60 | Abraham | 307—88.5 |
| 3,015,755 | 1/62 | Wright et al. | 307—88.5 |
| 3,070,711 | 12/62 | Marcus et al. | 307—88.5 |
| 3,089,039 | 5/63 | Abraham | 307—88.5 |

FOREIGN PATENTS 548,714 4/32 Germany.

OTHER REFERENCES

Integrated Semiconductor Devices, Willmark et al., RCA Engineer, 4th Anniversary Issue, June-July 1959, pages 42–45.

ARTHUR GAUSS, *Primary Examiner.*

GEORGE N. WESTBY, *Examiner.*